US012553575B2

(12) United States Patent
Jorgenson et al.

(10) Patent No.: US 12,553,575 B2
(45) Date of Patent: *Feb. 17, 2026

(54) DISTRIBUTED HYDROGEN ENERGY SYSTEM AND METHOD

(71) Applicant: BWR Innovations LLC, Fargo, ND (US)

(72) Inventors: Joel A. Jorgenson, Fargo, ND (US); Thomas W. Nelson, Fargo, ND (US)

(73) Assignee: BWR Innovations LLC, West Fargo, ND (US)

( * ) Notice: Subject to any disclaimer, the term of this patent is extended or adjusted under 35 U.S.C. 154(b) by 118 days.

This patent is subject to a terminal disclaimer.

(21) Appl. No.: 18/500,661

(22) Filed: Nov. 2, 2023

(65) Prior Publication Data

US 2024/0060603 A1 Feb. 22, 2024

Related U.S. Application Data

(63) Continuation of application No. 17/837,101, filed on Jun. 10, 2022, now Pat. No. 11,846,393.

(60) Provisional application No. 63/209,478, filed on Jun. 11, 2021.

(51) Int. Cl.
*F17C 5/06* (2006.01)

(52) U.S. Cl.
CPC .......... *F17C 5/06* (2013.01); *F17C 2221/012* (2013.01); *F17C 2223/0123* (2013.01); *F17C 2227/0157* (2013.01); *F17C 2265/07* (2013.01)

(58) Field of Classification Search
CPC .................. F17C 5/06; F17C 2221/012; F17C 2223/0123; F17C 2227/0157; F17C 2265/07; Y02E 60/36; Y02P 20/133

USPC .......................................................... 141/18
See application file for complete search history.

(56) References Cited

U.S. PATENT DOCUMENTS

| 5,592,028 | A | * | 1/1997 | Pritchard | .................. | F03D 9/19 |
| | | | | | | 290/55 |
| 6,674,263 | B2 | | 1/2004 | Agbossou | | |
| 6,841,893 | B2 | * | 1/2005 | Maiwald | .................... | F03B 3/06 |
| | | | | | | 290/43 |
| 7,000,395 | B2 | | 2/2006 | Wai | | |
| 7,181,316 | B2 | * | 2/2007 | Fairlie | ................. | H01M 8/0656 |
| | | | | | | 700/20 |

(Continued)

FOREIGN PATENT DOCUMENTS

CN     107448775 A     12/2017

OTHER PUBLICATIONS

PCT International Search Report and Written Opinion for PCT/US22/33198; Sep. 21, 2022.

*Primary Examiner* — Timothy P. Kelly
*Assistant Examiner* — Stephanie A Shrieves
(74) *Attorney, Agent, or Firm* — Neustel Law Offices

(57) ABSTRACT

A distributed hydrogen energy system adds onto existing infrastructure of a localized renewable energy microgrid and utilizes excess generated energy to power an electrolyzer to produce hydrogen gas on site that is compressed and stored in a stationary pressure vessel. The stored hydrogen gas can be used directly within the local renewable energy microgrid wherein the stored hydrogen gas is converted to energy through use of one or more fuel cells or can be used in the context of a distributed energy system wherein the stored hydrogen gas is shared as part of a larger distribution network via pipeline or via one or more portable pressure vessels.

30 Claims, 3 Drawing Sheets

(56) References Cited

U.S. PATENT DOCUMENTS

| | | | |
|---|---|---|---|
| 7,188,478 B2* | 3/2007 | Bourgeois | C25B 15/08 |
| | | | 60/39.511 |
| 7,199,482 B2* | 4/2007 | Hopewell | H02J 3/381 |
| | | | 290/44 |
| 7,565,224 B2 | 7/2009 | Fairlie | |
| 8,019,445 B2* | 9/2011 | Marhoefer | H01M 8/0612 |
| | | | 700/291 |
| 10,340,693 B2* | 7/2019 | Lansing, Jr. | H02J 3/28 |
| 2004/0013923 A1* | 1/2004 | Molter | H01M 8/0656 |
| | | | 429/444 |
| 2005/0165511 A1 | 7/2005 | Fairlie | |
| 2009/0313896 A1* | 12/2009 | Glidewell | C25B 1/04 |
| | | | 48/190 |
| 2013/0252120 A1 | 9/2013 | Robertson | |
| 2014/0102885 A1* | 4/2014 | Devine | C25B 15/02 |
| | | | 204/267 |
| 2016/0377342 A1* | 12/2016 | Mermelstein | H01M 8/04179 |
| | | | 62/617 |
| 2017/0145915 A1* | 5/2017 | Heid | C01C 1/003 |
| 2017/0207745 A1* | 7/2017 | Ishihara | H02S 40/22 |

* cited by examiner

DISTRIBUTED HYDROGEN ENERGY SYSTEM AND METHOD

CROSS REFERENCE TO RELATED APPLICATIONS

The present application is a continuation of U.S. application Ser. No. 17/837,101 filed on Jun. 10, 2022, which claims priority to U.S. Provisional Application No. 63/209,478 filed Jun. 11, 2021. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

The described example embodiments in general relate to the generation and distribution of hydrogen gas for the generation of electricity.

The potential for using hydrogen as a component of an energy network is growing in scope, with increasing products being made available that operate with hydrogen. Fundamentally, hydrogen is the most abundant element in the universe. The conversion of water to elemental hydrogen and oxygen through electrolysis, and the use of hydrogen fuel cells to produce electricity and water vapor is a reversable set of processes with little environmental impact.

To date, the availability of hydrogen is based on a distribution model similar to other industrial gases or petroleum products. A centralized source, such as an industrial gas supplier provides hydrogen in the form of pressurized storage containers or through the distribution of hydrogen in pipelines. Hydrogen can be comingled with other non-hydrogen industrial gases, such as natural gas, in the same pipeline at the same time, and is easily separated from other gases at the point of use.

This hydrogen distribution model is widespread but has inherent issues. Interruptions of product at the source, such as a refinery, will stop the distribution of hydrogen. Natural disasters, such as floods, hurricanes, tornadoes, earthquakes, or tsunamis, may affect the stability of the pipeline and interrupt delivery of hydrogen. The hydrogen pipeline may also be susceptible to disruptions in delivery due to maintenance, mechanical failures, or electrical failure of components. Finally, a new threat of bad actors, such as third parties that maliciously interrupt the delivery of hydrogen, exists in a traditional delivery model.

SUMMARY

In certain aspects, the present disclosure is directed to extending the capability of a renewable energy microgrid by making excess stored energy available to a broader reach of potential users through distributed generation of hydrogen and hydrogen resources. This concept of a distributed hydrogen network, with localized production of hydrogen gas at a renewable energy microgrid and sharing of that hydrogen gas with other remotely located microgrids, creates an inherently robust pipeline network wherein a single point of failure cannot disrupt the flow of hydrogen at local users.

In certain aspects, the present disclosure is directed to a distributed hydrogen generation system that can be combined with a renewable energy microgrid. The distributed hydrogen generation system includes an electrolyzer, a compressor, a stationary pressure vessel, a fuel cell, a pipeline and a portable pressure vessel.

The electrolyzer utilizes excess energy from the renewable energy microgrid to convert water into elemental hydrogen gas and oxygen gas. The compressor accepts the hydrogen gas from the electrolyzer, pressurizes the hydrogen gas and delivers the pressurized hydrogen gas to the stationary pressure vessel for storage.

The stored hydrogen gas can then be used locally within the renewable energy microgrid as a fuel to generate energy in addition to, or alternatively to, the energy generated by other renewable sources such as a wind turbine, solar cell or biomass. The stored hydrogen gas can also be distributed to remote locations via a pipeline coupled to the stationary pressure vessel and/or distributed through portable pressure vessels that are filled with hydrogen gas from the stationary pressure vessel. The distributed hydrogen can then be used to generate electricity at other renewable energy microgrids equipped with a fuel cell and/or used for other purposes. The distributed hydrogen gas can be utilized as a salable product for which money can be exchanged.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

A. Overview

Figure 1:
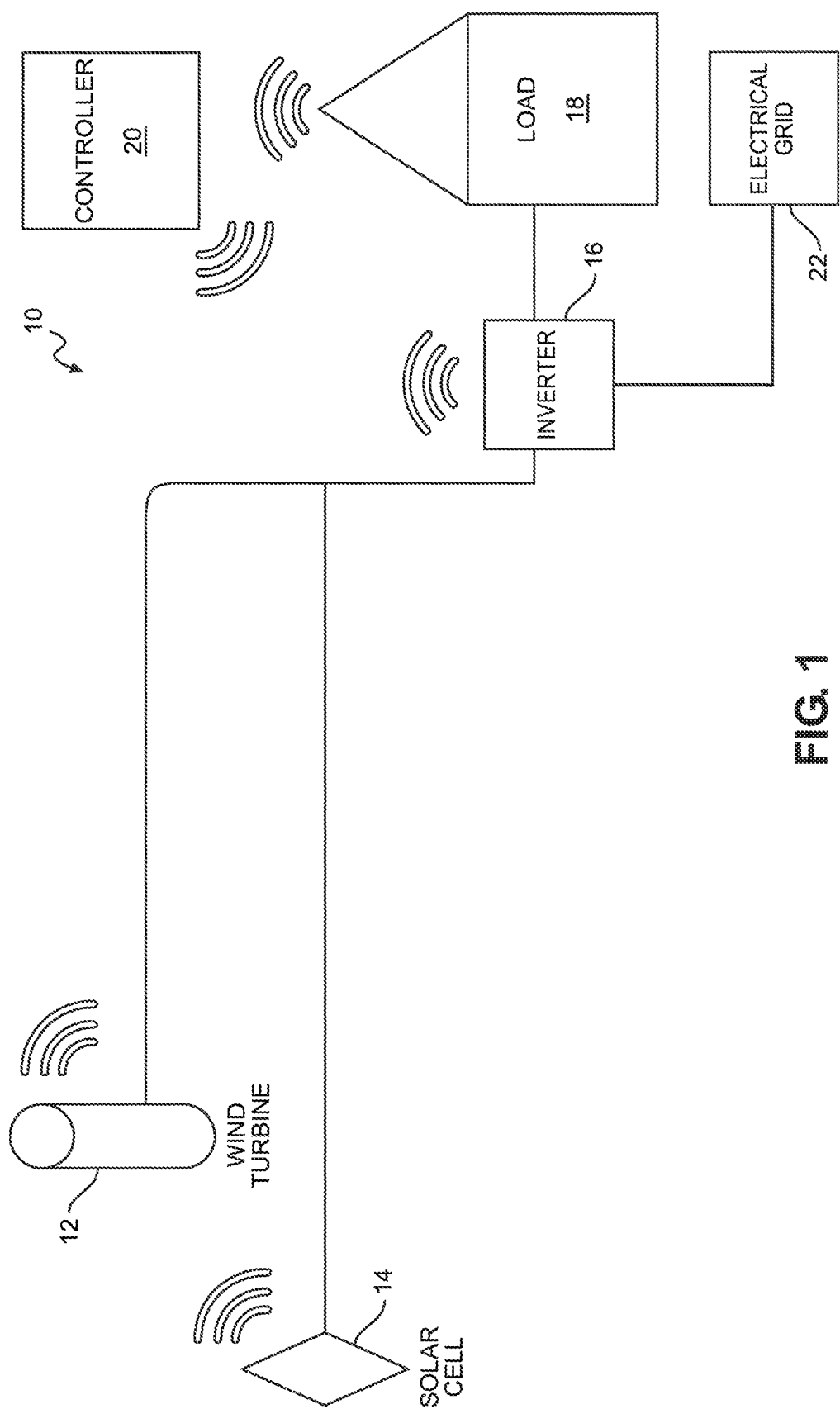
FIG. 1 illustrates a top-level example configuration of a renewable energy microgrid.

The various embodiments of the present disclosure relate to a distributed hydrogen energy system that adds onto the existing infrastructure of a localized renewable energy microgrid and utilizes excess generated energy to power an electrolyzer to produce hydrogen gas on site that is compressed and stored in a stationary pressure vessel. The stored hydrogen gas can be used directly within the local renewable energy microgrid wherein the stored hydrogen gas is converted to energy through use of one or more fuel cells or can be used in the context of a distributed energy system wherein the stored hydrogen gas is shared as part of a larger distribution network via pipeline or via portable pressure vessels.

In certain aspects, the present disclosure is directed to a method for distributing hydrogen gas. The method includes: (a) powering an electrolyzer 40 and a compressor 50 with excess energy generated from a renewable resource 12, 14 within a first renewable energy microgrid 10; (b) converting water into hydrogen gas with the powered electrolyzer 40; (c) compressing the hydrogen gas with the compressor 50; (d) delivering the compressed hydrogen gas to a stationary pressure vessel 60 located at the first renewable energy microgrid 10; and (e) delivering the compressed hydrogen gas from the stationary pressure vessel 60 to a second renewable energy microgrid 100 located remotely from the first renewable energy microgrid 10.

In certain aspects, the method for distributing hydrogen gas additionally includes: (a) supplying at least a portion of the compressed hydrogen gas from the stationary pressure vessel 60 to a first fuel cell 70 located at the first renewable energy microgrid 10; (b) generating energy with the first fuel cell 70; and (c) utilizing the energy generated with the first fuel cell 70 to power a first load 18 of the first renewable energy microgrid 10.

Figure 3:
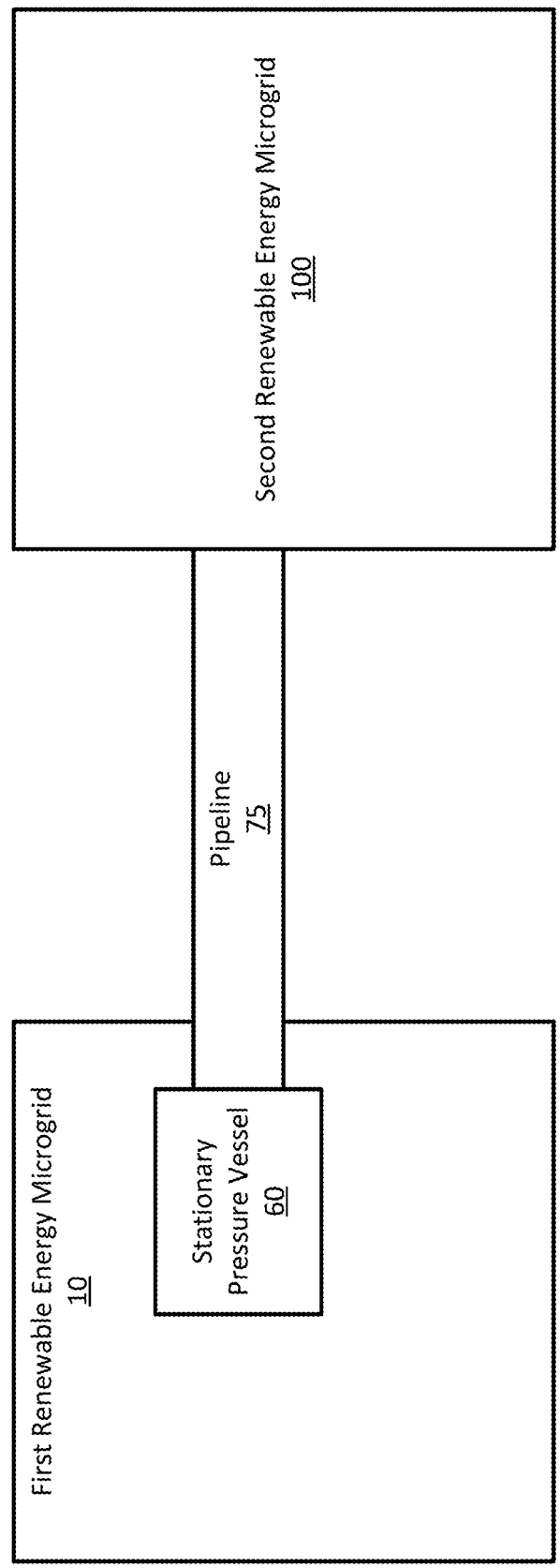
FIG. 3 illustrates a first renewable energy microgrid coupled to a second renewable energy microgrid by a pipeline.

In certain aspects, the method for distributing hydrogen gas additionally includes supplying the compressed hydrogen gas, which was delivered at the second renewable energy microgrid, to a second fuel cell located at the second renewable energy microgrid, generating energy with the second fuel cell, and utilizing the energy generated with the second fuel cell to power a second load of the second renewable energy microgrid. In certain aspects, delivering the portion of the compressed hydrogen gas from the stationary pressure vessel 60 to the second renewable energy microgrid comprises delivering the compressed hydrogen gas via a pipeline 75 (see FIG. 3) coupled to the stationary pressure vessel 60. In certain aspects, the pipeline 75 carries both a non-hydrogen gas and the compressed hydrogen gas. In certain embodiments, the method further comprises separating the compressed hydrogen gas from the non-hydrogen gas at the second renewable energy microgrid.

In certain aspects, delivering the portion of the compressed hydrogen gas from the stationary pressure vessel 60 to the second renewable energy microgrid comprises coupling at least one portable pressure vessel 78 to the stationary pressure vessel 60, filling the at least one portable pressure vessel 78 with a portion of the compressed hydrogen gas from the stationary pressure vessel 60 and transporting the at least one portable pressure vessel 78 to the second renewable energy microgrid.

In certain aspects, the renewable energy resource of the first renewable energy microgrid comprises one or both of a wind turbine 12 and a solar cell 14.

In certain aspects, the present disclosure is directed to a distributed hydrogen generation system 30 that includes an electrolyzer 40, a compressor 50, a stationary pressure vessel 60, and a hydrogen gas delivery means 75, 78. The electrolyzer 40 is powered by excess energy generated by a renewable resource 12, 14 of a first renewable energy microgrid 10 and produces hydrogen gas from water 42. The compressor 50 is powered by the excess energy generated by the renewable resource 12, 14 of the first renewable energy microgrid 10 and compresses the hydrogen gas produced by the electrolyzer 40. The stationary pressure vessel 60 is located at the renewable energy microgrid 10 and stores the compressed hydrogen gas. The delivery means 75, 78 delivers the compressed hydrogen gas from the stationary pressure vessel 60 to a second renewable energy microgrid.

In certain aspects, the delivery means of the distributed hydrogen generation system 30 comprises a pipeline 75 coupled to the stationary vessel 60. In certain aspects, the delivery means of the distributed hydrogen generation system 30 comprises a portable pressure vessel 78 filled with at least a portion of the compressed hydrogen gas stored in the stationary pressure vessel 60; the portable pressure vessel 60 being transportationally delivered at the second renewable energy microgrid.

B. Renewable Energy Microgrid

A renewable energy microgrid is a self-sufficient energy system that serves a discrete geographic footprint, such as a college campus, hospital complex, business center or neighborhood. Within a renewable energy microgrid are one or more kinds of distributed energy (e.g., wind, solar, biomass, nuclear, and other types of energy generated from resources that are not fossil fuel based) that produce its power. The renewable energy microgrid is a form of local energy that is independent (e.g., the renewable energy microgrid can disconnect from the central grid and operate independently) and is intelligent by utilizing a controller to orchestrate the multiple renewable energy resources to meet the energy requirements of the customers of the renewable energy microgrid.

Within the renewable energy microgrid, wind energy is converted to direct current electricity through the use of wind turbines and/or wind generators. Solar energy is converted to direct current electricity through the use of photovoltaic devices. Biomass is converted to direct current electricity through anaerobic digestion, burning, or through conversion to a gas or liquid fuel. In all cases, the renewable resources are consumed to produce electricity that is directly consumable at the point of production.

A top-level example architecture of a renewable energy microgrid 10 is illustrated in FIG. 1. As shown, the renewable energy microgrid 10 generally includes the components of a wind turbine 12, a solar cell 14, an inverter 16, a load 18 (e.g., site to be powered) and a microgrid controller 20. In operation, a network of transducers, sensors, and other communicating electronics across the renewable energy microgrid 10 are in communication with the microgrid controller 20 to determine operating conditions and provide precise control and oversight of the components of the renewable energy microgrid. For example, based on the forecast or detection of a bright sunny day, the microgrid controller 20 directs engagement of the photovoltaic cells of the solar cell 14 to convert solar energy into direct current electricity. Similarly, during windy conditions, the microgrid controller 20 additionally, or alternatively, directs engagement of the wind turbine 12 (and/or generators) to convert direct wind energy into direct current electricity. The microgrid controller 20 orchestrates supplying the direct current electricity to the invertor 16 for conversion to alternating current (single phase or multi-phase) and further orchestrates the delivery of the AC power output of the inverter 16 to the load 18. The inverter 16 is additionally coupled to an electrical grid 22 (e.g., an interconnected network providing power generation, transmission and distribution of electricity from producers to consumers). In the renewable energy microgrid 10 of FIG. 1, excess energy generated by the renewable resources is often wasted. In some instances, the microgrid controller 20 monitors the electrical grid 22 for opportunities to sell electricity to the grid 22.

The renewably energy microgrid 10 additionally includes circuitry and components that interact with the microgrid controller 20 to enable maximum power point tracking, signal and voltage conditioning, transient management, and load smoothing. These components and circuits are included into the design and implementation of the microgrid 10 to provide the maximum possible power transfer and to mitigate downstream impact on variable and intermittent power delivery.

A second renewable energy microgrid 100, referenced herein, is similarly configured to the renewable energy microgrid 10 but is located remotely from the renewable energy microgrid 10.

C. Renewable Energy Microgrid with Hydrogen Distribution

Figure 2:
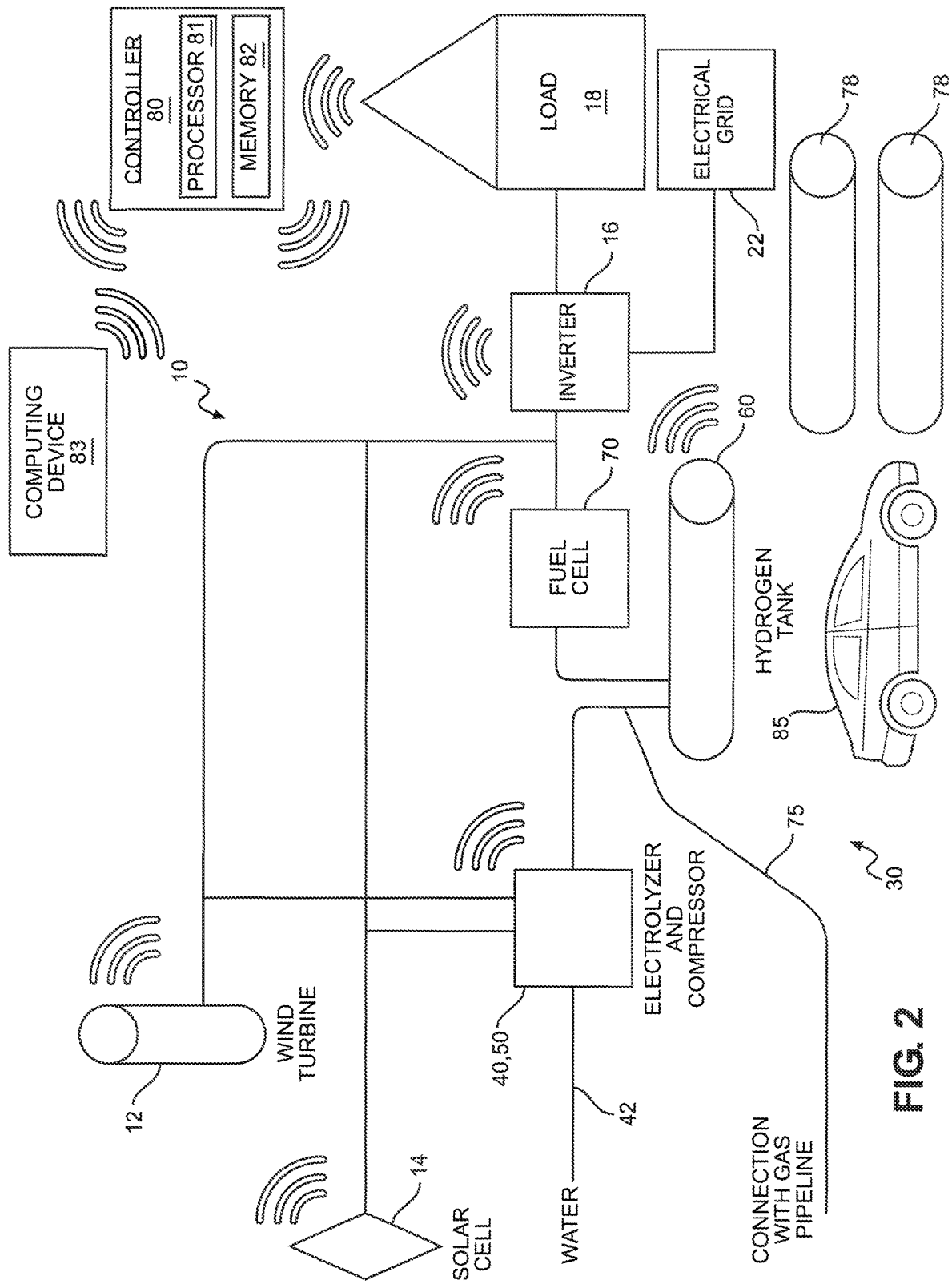
FIG. 2 illustrates the top-level example configuration of a renewable energy microgrid of FIG. 1 with the addition of a distributed hydrogen generation system.

FIG. 2 illustrates the renewable energy microgrid 10 of FIG. 1 with a distributed hydrogen generation system 30, according to the present disclosure. The distributed hydrogen generation system 30 generally comprises an electrolyzer 40, a compressor 50, a stationary pressure vessel 60, a fuel cell 70, and a microgrid controller 80. The electrolyzer 40 and compressor 50 are operably coupled (e.g., coupled to the energy generated by the one or more of the wind turbines 12 and/or coupled to the energy generated by one or more of the solar cells 14 within the renewable energy microgrid 10) to utilize the excess energy generated by the renewable resources. The distributed hydrogen generation system 30 additionally includes one more hydrogen gas distribution means which include, for example, a hydrogen pipeline 75 that is operably coupled to the pressure vessel 60 and one or more portable pressure vessels 78.

C.(i). Electrolyzer.

The electrolyzer 40 is a system that uses electricity to break water into hydrogen and oxygen through a process called electrolysis. Electrolysis utilizes direct current to split the water into its elemental components of oxygen and hydrogen. Pure oxygen is heavier than pure hydrogen, and the gases are able to be separated as hydrogen will flow to the top of the separated gas mixture and the oxygen will sink to the bottom of the separated gas mixture. The oxygen can then be released to the atmosphere without impact on the environment.

In certain embodiments, the electrolyzer 40 is supplemented or replaced with another type of reformer. These other reformers may be steam reformers, catalyst reformers, or combustion reformers that produce hydrogen gas from methanol, ethanol, natural gas, propane, gasoline, diesel, or other fuels. Other types of reformers can comprise biomass reformers to produce hydrogen from methane, distiller's grains, sugar beet pulp, or other renewables from agricultural products.

C.(ii). Compressor.

The compressor 50 comprises a hydrogen compressor that increases the pressure of hydrogen gas by reducing its volume resulting in compressed hydrogen gas. The compressor 50 receives uncompressed hydrogen gas from the electrolyzer 40 at an inlet and outputs the compressed hydrogen gas to the stationary pressure vessel 60.

C.(iii). Stationary Pressure Vessel.

The stationary pressure vessel 60 stores the compressed hydrogen gas received from the compressor 50. Storage of hydrogen as a gas typically requires high-pressure tanks (e.g., 350-700 bar [5000-10,000 psi] tank pressure). The stationary pressure vessel 60 is typically of a steel construction. The stationary storage vessel 60 holds the hydrogen gas at a pressure greater than ambient pressure. The stationary storage vessel 60 can be of indeterminant size and is not fundamentally limited in size due to mechanical limitations.

C.(iv). Fuel Cell.

The fuel cell 70 is a device that generates electricity from an electrochemical reaction through use of an anode, cathode and electrolyte membrane. The fuel cell 70 passes hydrogen through the anode and oxygen through the cathode. At the anode, a catalyst splits the hydrogen molecules into electrons and protons. The protons pass through the porous electrolyte membrane, while the electrons are forced through a circuit, generating an electric current and a byproduct of excess heat. At the cathode, the protons, electrons, and oxygen combine to produce a byproduct of water molecules, which can be released into the atmosphere.

C.(v). Pipeline.

The pipeline 75 comprises a delivery means for the hydrogen gas. The pipeline 75 is coupled to the stationary pressure vessel 60 and delivers, via a pipeline network, at least a portion of the compressed hydrogen gas stored in the stationary pressure vessel 60 to a second renewable energy microgrid that is located remotely from renewable energy microgrid 10 at which the stationary pressure vessel 60 is located. The hydrogen gas can then be supplied to a fuel cell for the generation of energy that can be used to power a load of the second renewable energy microgrid. Non-hydrogen gases can also be delivered, along with the hydrogen gas, in the same pipeline; the hydrogen gas can then be separated from the non-hydrogen gases at its delivery destination.

C.(vi). Portable Pressure Vessel

The portable pressure vessel 78 comprises a delivery means for the hydrogen gas. The portable pressure vessel 78 is removably couplable to the stationary pressure vessel 60. When coupled to the stationary pressure vessel 60, the portable pressure vessel 78 is filled with at least a portion of the compressed hydrogen gas stored in the stationary pressure vessel 60. Once filled, the portable pressure vessel 78 is transported to a second renewable energy microgrid that is located remotely from renewable energy microgrid 10 at which the stationary pressure vessel 60 is located. The hydrogen gas from the portable pressure vessel 78 can then be supplied to a fuel cell at the remote location for the generation of energy that can be used to power a load of the second renewable energy microgrid.

C.(vii). Microgrid Controller.

The microgrid controller 80 generally includes the components of a processor 81 and non-transitory memory 82. The processor 81 executes instructions stored in the non-transitory memory 82 and interfaces, via wired and/or wireless communication, with the components of the renewable energy microgrid 10, the distributed hydrogen generation system 30, and their respective control systems to achieve desired operation. The microgrid controller 80 is additionally in wired or wireless communication with a computing device 83 (e.g., smart phones, smart watches, tablets, laptop computers, desktop computers, servers, embedded systems, and dedicated displays, etc.) enabling the reporting and storage of data reflective of the operation of the renewable energy microgrid 10 and distributed hydrogen generation system 30 and enabling the remote programming of the microgrid controller 80.

The microgrid controller 80 includes the functionalities of the microgrid controller as well as other functionalities specific to the distributed hydrogen generation system 30. For example, in some instances, the microgrid controller 80 not only monitors the electrical grid 22 for opportunities to sell electricity to the grid 22 but also monitors the electrical grid 22 for the opportunity to tap the grid power during very low-cost periods of operation to produce hydrogen gas. Functionalities of the microgrid controller 80 are used to remotely assess the operation and status of all components, and to remotely manage different components as needed. Parameters monitored by the microgrid controller 80 for desired operation can include, but are not limited to:

(a) Output voltages and output currents of individual solar cells 14 and a solar array comprised of a plurality of the individual solar cells 14;

(b) Output voltages and output current of the wind turbine;

(c) Wind speed, air temperature, humidity, air pressure, rainfall, and wind direction of the environment of the renewable energy microgrid with distributed hydrogen generation system 30;

(d) Water pressure and/or water flow to the electrolyzer 40;

(e) Hydrogen and/or oxygen production of the electrolyzer 40;

(f) Internal voltages, pressure, state variables, counters, timers, enumerations, and currents of the electrolyzer 40;

(g) Inlet pressure, output pressure, temperature, input current, input voltage, rotational speed, and vibration of the compressor 50;

(h) Pressure and temperature of the pressure vessel 60 storing hydrogen gas;

(i) Internal voltages, pressures, state variables, counters, timers, enumerations, and currents of the fuel cells 70; and/or (j) Input and output voltages, input and output currents, state variables, timers, counters, temperatures, phases, frequencies and enumerations of the inverter 16.

The microgrid controller 80 has both monitoring and management functions. In the monitoring functions, one or more of the listed parameters are available for remote visibility from wired or wireless devices connected to the microgrid controller 80 via one or more network communication channels in communication with the computing device 83. A list of example computing devices 83 that are available for viewing the parameters include, but are not limited to: smart phones, smart watches, tablets, laptop computers, desktop computers, servers, embedded systems, and dedicated displays.

Remote management functions of the microgrid controller 80 are accessed through a secure network entry point via one or more of the example devices noted above. Management functionalities include the ability to turn on or turn off components of the renewable energy microgrid 10 and the distributed hydrogen generation system 30, adjust settings and change parameters utilizing a wired or wireless network communication channel. Notably, a qualified user does not need to be physically near the components to make adjustments as the network communication between the computing device 83 and the microgrid controller 80 enable real-time interaction with the renewable energy microgrid 10 and the distributed hydrogen generation system 30.

Further, the ability to remotely and securely access the renewable energy microgrid and the distributed hydrogen generation system 30 enables visibility of the overall installation including the magnitude of renewable energy available, the efficiencies of conversion from renewable energy to direct current electricity, the amount of electricity being consumed instantaneously or over a period of time, and the amount of energy that is consumed from excess production to stored energy in the form of compressed hydrogen. The ability to remotely and securely access the renewable energy microgrid 10 and the distributed hydrogen generation system 30 also provides dashboard access of operation and status as well as historical information and prediction on future conditions.

Status and operational data collected from the renewable energy microgrid 10 and the distributed hydrogen generation system 30, via the microcontroller 80, can be stored locally and/or remotely, e.g., cloud storage, enabling access to the data at any time and any place by the computing device 83. Cloud-based storage helps to improve the reliability of stored information as cloud-based storage is likely to be less subject to breakdowns, power interruptions, or the threat of viruses, malware, or ransomware. Stored status and operational data can be analyzed and utilized for a large number of purposes, e.g., (a) machine learning to optimize operation of the renewable energy microgrid 10 and the distributed hydrogen generation system 30, (b) customer relationship management by providing the customer insight into operation the renewable energy microgrid 10 and the distributed hydrogen generation system 30; (c) enterprise management; (d) financial forecasting; and/or (e) accounting. Status and operational data can also be used to isolate issues in the event of unscheduled interruptions, plan for routine or schedule maintenance, and/or to consider the sales of excess stored energy when demand is less than the forecasted ability to capture and store renewable energy.

The sales of excess stored energy can provide a source of income that was previously non-existent. For example, the renewable energy microgrid 10 and the distributed hydrogen generation system 30 provide the ability to monetize stored energy via either local distribution sales or network distribution sales. Local distribution sales can occur by filling one or more of the portable pressure vessels 78 with hydrogen gas from the stationary pressure vessel 60 and distributing the one or more portable pressure vessels 78 to a remote location. Network distribution sales can occur by releasing stored hydrogen gas from the stationary pressure vessel 60 to a gaseous distribution network via the pipeline 75. Notably, hydrogen gas can be comingled with other non-hydrogen gases, such as natural gas, in the same pipeline at the same time and can then be easily separated from the other gases at the point of use.

Collected status and operational data on the renewable energy microgrid 10 and the distributed hydrogen generation system 30 can also be used for operational purposes, financial purposes, marketing purposes, maintenance purposes, engineering purposes, and/or regulatory purposes. For example, an operational perspective is to determine the amount of stored hydrogen gas and compare it to the forecasted demand, which can be a combination of expected load, expected weather, and expected hydrogen generation capabilities. An operational decision can be made to engage or disengage components to increase or decrease the hydrogen generation capability based on expected conditions.

From a financial perspective, the capability of the localized hydrogen generation is a new-found ability to store energy from a renewable sources such as solar and wind. Without the hydrogen gas storage capability, excess energy from wind and solar, defined as the amount of energy produced at any instance of time that exceeds the demand at the site of production, would either be unsold or sold to the electrical grid at spot market prices. With the capability of storing hydrogen gas, new financial opportunities exist. The hydrogen gas can be used at a later date, reducing the cost of electricity consumed from an external grid. The stored hydrogen gas can be sold via a connected pipeline 75 at spot or contracted prices. The hydrogen gas can be sold via separate portable pressure vessels 78 that are physically connected to the stationary pressure vessel momentarily.

Marketing purposes for the remote management include, but are not limited to, promoting the hydrogen gas production capabilities to entice customers to buy hydrogen gas or to buy the means for a distributed hydrogen/distributed electrical generation system.

Engineering purposes for the remote management is to review operational parameters and to make potential adjustments to improve efficiencies, reduce temperatures/pressures/voltages/currents, and to make software adjustments or updates of the renewable energy microgrid 10 and the distributed hydrogen generation system 30.

Maintenance purposes for the remote management include the abilities to engage or disengage features/functions for inspections and system improvements of the renewable energy microgrid 10 and the distributed hydrogen generation system 30.

Regulatory purposes for the remote management include the ability to provide increased generation for capacity needs or to reduce generation for grid/net/pipeline factors at the renewable energy microgrid 10 and the distributed hydrogen generation system 30.

D. Operation of Preferred Embodiment

In use, the electrolyzer 40 and compressor are both powered by the excess energy of the renewable energy microgrid 10. The electrolyzer 40 is supplied with water 42 and uses electricity to split the water 42 into its elemental components of oxygen and hydrogen. The oxygen is released into the atmosphere without any environmental or ecological effects leaving behind only the hydrogen gas.

The hydrogen gas from the electrolyzer 40 enters the compressor through an inlet valve, which decreases the total gas volume by increasing the static pressure acting on the gas. The compressor 50 then outputs the hydrogen gas to the stationary pressure vessel 60.

The stationary pressure vessel 60 is filled to its capacity with the hydrogen gas once the pressure of the stored hydrogen gas reaches the pressure limits of the pressure vessel, or when the pressure of the stored hydrogen gas reaches the pressure limits of the compressor 50, whichever of the two is smaller.

The stored hydrogen gas within the stationary pressure vessel 60 is now available at any time to be used: (a) by the fuel cell 70 operably coupled to the pressure vessel 60; (b) by the pipeline 75 operably coupled to the stationary pressure vessel 60; and/or (c) to fill portable hydrogen pressure vessels 78 coupled to the stationary pressure vessel 60, as directed by the microgrid controller 80.

When the stored hydrogen gas is used by the fuel cell 70, the hydrogen gas is delivered from the stationary pressure vessel 60 to the fuel cell 70 wherein the hydrogen gas is converted to direct current electricity. The direct current electricity is supplied at the inverter 16, along with direct current from the wind turbine 12 and/or solar cell 14, to be converted to single phase or three-phase alternating current that is supplied to the load 18.

When the hydrogen gas is used by the pipeline 75, the hydrogen gas is delivered from the stationary pressure vessel 60 to the connected pipeline 75, which is connected to one or more wider gas distribution pipelines for delivery at remote locations such as a remotely located second renewable energy microgrid wherein the hydrogen gas can be converted to energy by a fuel cell. While being distributed via pipeline 75, the hydrogen gas can be comingled with other non-hydrogen gases, such as natural gas, in the same pipeline at the same time, and can be separated from other gases at the point of use.

When the hydrogen gas is used to fill separate portable pressure vessels 78, the hydrogen gas is delivered from the stationary pressure vessel 60 to the portable pressure vessel 78 which is capped and transportationally distributed to a remote location for use within a second renewable energy microgrid equipped with a fuel and/or other locations for other uses. In certain examples, another use for the portable pressure vessels 78 is to supply the hydrogen gas for refueling hydrogen-powered vehicles 85 (e.g., cars, tractors, trucks, off-road and other electric vehicles wherein hydrogen gas is a preferred storage solution over a solution completely relying on batteries).

In certain embodiments, the distribution of the hydrogen gas, via pipeline 75 or portable pressure vessel 78, is in the context of a salable product for which money is exchanged.

In view of the above, it can be appreciated that the distributed hydrogen generation system 30 extends the capability of the renewably energy microgrid 10 by making excess stored energy available to a broader reach of potential users through distributed generation of hydrogen gas and sharing of hydrogen gas resources. This concept of a distributed hydrogen network, with localized hydrogen gas production and remote sharing of the hydrogen gas among other remote renewable energy microgrids, creates an inherently robust hydrogen gas distribution network wherein single points of failure cannot disrupt the flow of hydrogen or the user of hydrogen at local users.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," "including," "has," and "having" are interchangeable and not intended to be limiting. The term "such as" also is not intended to be limiting. The term "including" shall mean "including, but not limited to."

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore de sired that the various embodiments in the present disclosure be considered in all respects as illustrative and not restrictive. Any headings utilized within the description are for convenience only and have no legal or limiting effect.

What is claimed is:

1. A distributed hydrogen generation system, comprising;
an electrolyzer wherein the electrolyzer produces hydrogen gas from water;
a compressor, wherein the compressor compresses the hydrogen gas to produce a compressed hydrogen gas;
a stationary pressure vessel located at a first renewable energy microgrid, wherein the stationary pressure vessel stores the compressed hydrogen gas;
a delivery means for delivering the compressed hydrogen gas from the stationary pressure vessel to a second renewable energy microgrid, wherein the first renewable energy microgrid and the second renewable energy microgrid each comprise a self-sufficient energy system that operates independently of a central grid; and
a controller, wherein the controller is in communication with one or more components of the distributed hydrogen generation system, wherein the one or more components include the electrolyzer, the compressor, the stationary pressure vessel and the delivery means, and wherein the controller monitors operations of the one or more components.

2. The distributed hydrogen generation system of claim 1, wherein the controller monitors one or both of water pressure and water flow to the electrolyzer.

3. The distributed hydrogen generation system of claim 1, wherein the electrolyzer also produces oxygen from the water and wherein the controller monitors an amount of hydrogen, oxygen, or hydrogen and oxygen that the electrolyzer produces.

4. The distributed hydrogen generation system of claim 1, wherein the controller monitors an internal voltage, a pressure, a state variable, a counter, a timer, an enumeration, and a current of the electrolyzer.

5. The distributed hydrogen generation system of claim 1, wherein the controller monitors an inlet pressure, an output pressure, a temperature, an input current, an input voltage, a rotational speed, and a vibration of the compressor.

6. The distributed hydrogen generation system of claim 1, wherein the controller monitors a pressure and a temperature of the stationary pressure vessel.

7. The distributed hydrogen generation system of claim 1, wherein the compressed hydrogen gas is supplied to a fuel cell at the first renewable energy microgrid and wherein the controller monitors an internal voltage, a pressure, a state variable, a counter, a timer, an enumeration, and a current of the fuel cell.

8. The distributed hydrogen generation system of claim 1, wherein the operations monitored by the controller are communicated to a computing device for display.

9. The distributed hydrogen generation system of claim 1, wherein the controller controls the operations of the one or more components through execution of a program stored in a non-transitory memory of the controller.

10. The distributed hydrogen generation system of claim 1, wherein the delivery means comprises a pipeline coupled to the stationary pressure vessel.

11. The distributed hydrogen generation system of claim 10, wherein the pipeline carries both the compressed hydrogen gas and a non-hydrogen gas.

12. The distributed hydrogen generation system of claim 1, wherein the delivery means comprises a portable pressure vessel filled with at least a portion of the compressed hydrogen gas stored in the stationary pressure vessel.

13. The distributed hydrogen generation system of claim 1, wherein the electrolyzer and the compressor are powered with excess energy generated from a renewable resource within the first renewable energy microgrid and wherein the renewable resource comprises a wind turbine.

14. The distributed hydrogen generation system of claim 1, wherein the electrolyzer and the compressor are powered with excess energy generated from a renewable resource within the first renewable energy microgrid and wherein the renewable resource comprises solar cell.

15. A method for distributing hydrogen gas, comprising:
powering an electrolyzer and a compressor located at a first renewable energy microgrid;
converting water into hydrogen gas with the electrolyzer;
compressing the hydrogen gas with the compressor to produce a compressed hydrogen gas;
delivering the compressed hydrogen gas to a stationary pressure vessel located at the first renewable energy microgrid;
delivering, with a delivery means, the compressed hydrogen gas from the stationary pressure vessel to a second renewable energy microgrid remote from the first renewable energy microgrid, wherein the first renewable energy microgrid and the second renewable energy microgrid each comprise a self-sufficient energy system that operates independently of a central grid; and
monitoring, with a controller, operations of one or more of the electrolyzer, the compressor, the stationary pressure vessel, and the delivery means.

16. The method of claim 15, wherein the method further comprises supplying the compressed hydrogen gas delivered at the second renewable energy microgrid to a fuel cell located at the second renewable energy microgrid, generating energy with the fuel cell, and utilizing the energy generated with the fuel cell to power a load of the second renewable energy microgrid.

17. The method of claim 16, further comprising monitoring the fuel cell and wherein monitoring of the fuel cell includes monitoring an internal voltage, a pressure, a state variable, a counter, a timer, an enumeration, and a current of the fuel cell.

18. The method of claim 15, wherein delivering the compressed hydrogen gas from the stationary pressure vessel to the second renewable energy microgrid comprises delivering the compressed hydrogen gas with the delivery means in the form of a pipeline that carries the compressed hydrogen gas and is coupled between the stationary pressure vessel and the second renewable energy microgrid.

19. The method of claim 18, wherein the pipeline additionally carries a non-hydrogen gas.

20. The method of claim 19, further comprising separating the compressed hydrogen gas from the non-hydrogen gas at the second renewable energy microgrid.

21. The method of claim 15, wherein delivering the compressed hydrogen gas from the stationary pressure vessel to the second renewable energy microgrid remote from the first renewable energy microgrid comprises coupling at least one portable pressure vessel to the stationary pressure vessel, filling the at least one portable pressure vessel with the compressed hydrogen gas from the stationary pressure vessel, and transporting the at least one portable pressure vessel to the second renewable energy microgrid.

22. The method of claim 15, wherein the method further comprises powering the electrolyzer and the compressor with excess energy generated from a renewable resource within the first renewable energy microgrid and wherein the renewable resource comprises a wind turbine.

23. The method of claim 15, wherein the method further comprises powering the electrolyzer and the compressor with excess energy generated from a renewable resource within the first renewable energy microgrid and wherein the renewable resource comprises solar cell.

24. The method of claim 15, wherein monitoring the electrolyzer includes monitoring one or both of water pressure and water flow at the electrolyzer.

25. The method of claim 15, wherein monitoring the electrolyzer includes monitoring an amount of hydrogen, an amount of oxygen, or an amount of both hydrogen and oxygen produced by the electrolyzer.

26. The method of claim 15, wherein monitoring the electrolyzer includes monitoring an internal voltage, a pressure, a state variable, a counter, a timer, an enumeration, and a current of the electrolyzer.

27. The method of claim 15, wherein monitoring the compressor includes monitoring an inlet pressure, an output pressure, a temperature, an input current, an input voltage, a rotational speed, and a vibration of the compressor.

28. The method of claim 15, wherein monitoring the stationary pressure vessel includes monitoring a pressure and a temperature of the stationary pressure vessel.

29. The method of claim 15, further comprising communicating the operations monitored by the controller to a computing device for display.

30. A method for distributing hydrogen gas, comprising:

powering an electrolyzer and a compressor at a first renewable energy microgrid;

converting water into hydrogen gas with the electrolyzer;

compressing the hydrogen gas with the compressor to produce a compressed hydrogen gas;

delivering the compressed hydrogen gas to a stationary pressure vessel located at the first renewable energy microgrid; and delivering the compressed hydrogen gas from the stationary pressure vessel to a second renewable energy microgrid remote from the first renewable energy microgrid, wherein the first renewable energy microgrid and the second renewable energy microgrid each comprise a self-sufficient energy system that operates independently of a central grid.

* * * * *